US006571602B2

United States Patent
Ohkuma (10) Patent No.: US 6,571,602 B2
(45) Date of Patent: Jun. 3, 2003

(54) APPARATUS AND METHOD FOR DETECTING CATALYST TEMPERATURE

(75) Inventor: Shigeo Ohkuma, Atsugi (JP)

(73) Assignee: Unisia Jecs Corporation, Kanagawa-ken (JP)

(*) Notice: Subject to any disclaimer, the term of this patent is extended or adjusted under 35 U.S.C. 154(b) by 15 days.

(21) Appl. No.: 09/879,996

(22) Filed: Jun. 14, 2001

(65) Prior Publication Data

US 2002/0005064 A1 Jan. 17, 2002

(30) Foreign Application Priority Data

Jun. 15, 2000 (JP) ........................ 2000-180469

(51) Int. Cl.$^7$ .................. G01N 33/497; G01M 19/00
(52) U.S. Cl. ...................... 73/23.32; 73/118.1
(58) Field of Search ................ 73/116, 118.1, 73/23.31, 23.32; 60/274, 276, 285, 275, 272; 123/672, 676, 688, 691, 697; 701/103; 340/438, 449

(56) References Cited

U.S. PATENT DOCUMENTS 5,513,522 A * 5/1996 Seki et al. ............. 73/118.1
6,089,017 A * 7/2000 Ogawa et al. ............. 60/285

FOREIGN PATENT DOCUMENTS

| JP | 5-200249 | 8/1993 |
| JP | 9-108543 | 4/1997 |
| JP | 10-103134 | 4/1998 |
| JP | 2000-227364 | 8/2000 |

* cited by examiner

Primary Examiner—Eric S. McCall
Assistant Examiner—Maurice Stevens
(74) Attorney, Agent, or Firm—Sughrue Mion, PLLC (57) ABSTRACT

The present invention is to detect a temperature of an exhaust gas purification catalyst in order to determined an air-fuel ratio feedback control start time of an internal combustion engine, wherein the temperature of the exhaust gas purification catalyst is detected by estimation and computation based on an element impedance of an air-fuel ratio sensor.

19 Claims, 5 Drawing Sheets

APPARATUS AND METHOD FOR DETECTING CATALYST TEMPERATURE

FIELD OF THE INVENTION

The present invention relates to an apparatus and a method for indirectly estimating and detecting a temperature of an exhaust gas purification catalyst mounted to an exhaust system in an internal combustion engine.

RELATED ART OF THE INVENTION

In order to detect a catalyst temperature representing an active state of an exhaust gas purification catalyst, a temperature sensor is provided to a catalyst to detect the catalyst temperature or a heat supply amount from the exhaust gas to the catalyst is calculated to detect the catalyst temperature. The former is disclosed in Japanese Unexamined Patent Publication 5-200249, and the latter in Japanese Unexamined Patent Publication 9-108543.

However, the provision of the temperature sensor brings cost-up, while the estimation of temperature is difficult to ensure a sufficient accuracy.

SUMMARY OF THE INVENTION

The present invention, in view of the above conventional problems, has been achieved and an object of the invention is to detect a temperature of an exhaust gas purification catalyst in an internal combustion engine with high accuracy.

Another object of the present invention is to detect a temperature of an exhaust gas purification catalyst by the estimation computation without a need of providing a temperature sensor and a cost-up due to the provision of temperature sensor.

A further object of the present invention is to improve an exhaust gas purification performance by accelerating an air-fuel ratio feedback starting time as early as possible due to high accurate estimation and detection of a catalyst temperature.

The present invention is constituted as follows in order to achieve the above objects.

An impedance of a sensor element of an air-fuel ratio sensor mounted to an exhaust system in an internal combustion engine is detected.

Then, a temperature of an exhaust gas purification catalyst mounted to the exhaust system as well as the air-fuel ratio sensor is detected by estimating computation based on the detection value of the impedance.

Namely, since a heat capacity of the sensor element is small, a temperature of the sensor element is substantially the same as a temperature of the exhaust gas passing through the air-fuel ratio sensor. On the other hand, the impedance of the sensor element is decreased with the increase of the temperature of the sensor element. Accordingly, the temperature of the sensor element and further the temperature of the exhaust gas flowing in the air-fuel ratio sensor can be estimated by detecting the impedance.

The temperature of the exhaust gas purification catalyst is substantially equal to the temperature of the exhaust gas flowing in this catalyst, which is close to the temperature of the exhaust gas flowing in the air-fuel ratio sensor. Therefore, as a result, the catalyst temperature can be estimated accurately based on the detection result of the impedance of the air-fuel ratio sensor.

In an apparatus where air-fuel ratio sensors are disposed upstream and downstream of the exhaust gas purification catalyst, by using both impedances of the sensor elements of these air-fuel ratio sensors or placing more importance on the impedance detection value of the sensor element more closely related to the catalyst temperature estimation, the temperature of the exhaust gas purification catalyst can be estimated more accurately.

The other objects and features of this invention will become understood from the following description with accompanying drawings.

EMBODIMENT

Figure 1:
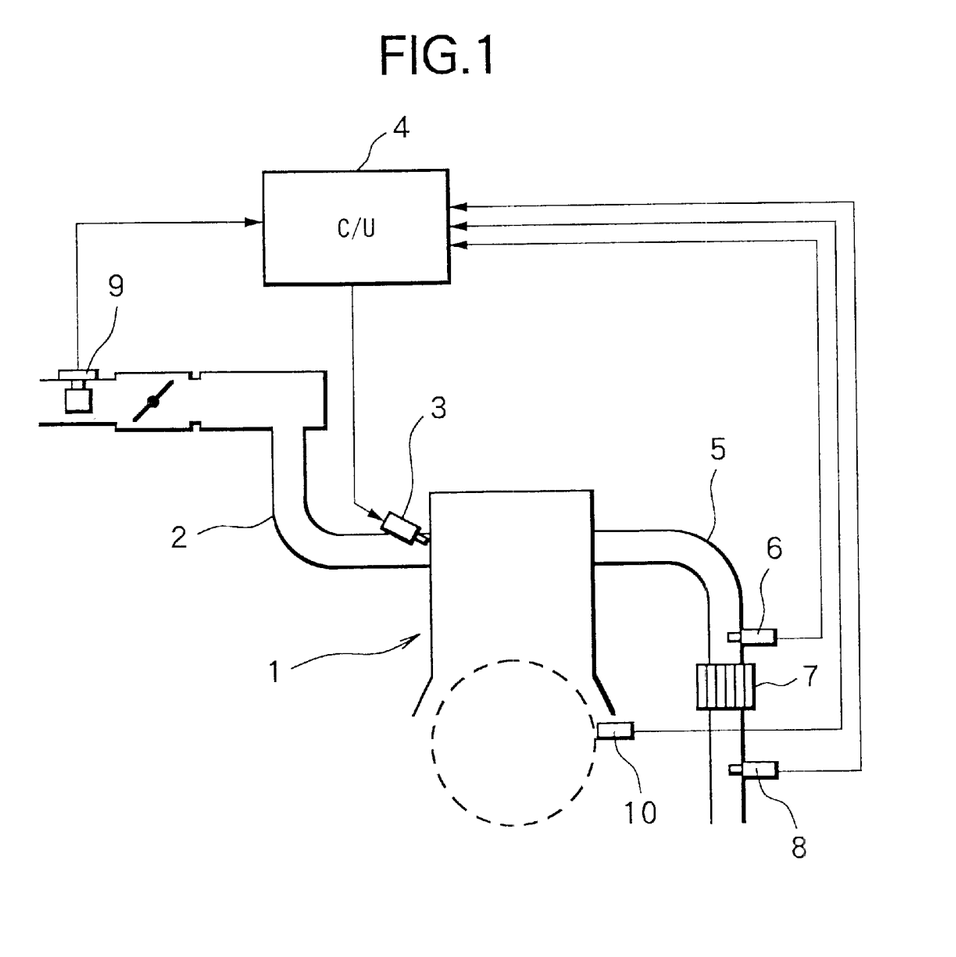
FIG. 1 is a system diagram of an air-fuel ratio feedback control apparatus of an internal combustion engine in an embodiment according to the present invention.

In FIG. 1 showing a system structure of an apparatus in an embodiment, a fuel injection valve 3 is disposed so as to face an intake passage 2 or a combustion chamber for each cylinder in an internal combustion engine 1, and the fuel injection from each fuel injection valve 3 is controlled by a control unit 4.

An upstream side air-fuel ratio sensor 6 is disposed at the junction of an exhaust manifold in an exhaust passage 5, and an exhaust gas purification catalyst 7 is disposed in an exhaust pipe connected to a downstream side of the exhaust manifold, and a downstream side air-fuel ratio sensor 8 is disposed in a downstream side of the exhaust pipe.

The control unit 4 computes a basic fuel injection quantity Tp=K×Qa/Ne (K is constant) equivalent to a stoichiometric amount of value ($\lambda$=1) based on an intake air quantity Qa detected based on a signal from an air flow meter 9 disposed in an upstream of the intake passage 2, and an engine rotation number Ne detected based on a signal from a crank angle sensor 10. Then, the control unit 4 corrects this basic fuel injection quantity by an air-fuel ratio feedback correction coefficient α set based on a target air-fuel ratio t$\mu$ and signals from the upstream side air-fuel ratio sensor 6 and the downstream side air-fuel ratio sensor 8 to compute a final fuel injection quantity Ti=Tp×(1/t$\lambda$)×α, and output a fuel injection pulse with pulse width corresponding to this Ti to each fuel injection valve 3 in synchronization with the engine rotation.

Here, each of the air-fuel ratio sensors 6 and 8 outputs a signal corresponding to an oxygen concentration in the exhaust gas. The control unit 4 detects an air-fuel ratio $\lambda$ of an air-fuel mixture being supplied to the engine 1, and feedback controls the air-fuel ratio $\lambda$ to the target air-fuel ratio t$\lambda$ by increasingly/decreasingly setting the air-fuel ratio feedback correction coefficient α by a proportional-integral control.

For each of the air-fuel ratio sensors 6 and 8, a wide range type air-fuel ratio sensor is used capable of detecting the air-fuel ratio linearly.

A sensor element structure of each of the wide range type air-fuel ratio sensors 6 and 8 will be explained based on FIG. 2.

A body 20 of the sensor element having a porous layer is formed of a solid electrolyte material, such as zirconia, with oxygen ion conductivity, to be disposed in the exhaust passage.

Figure 2:
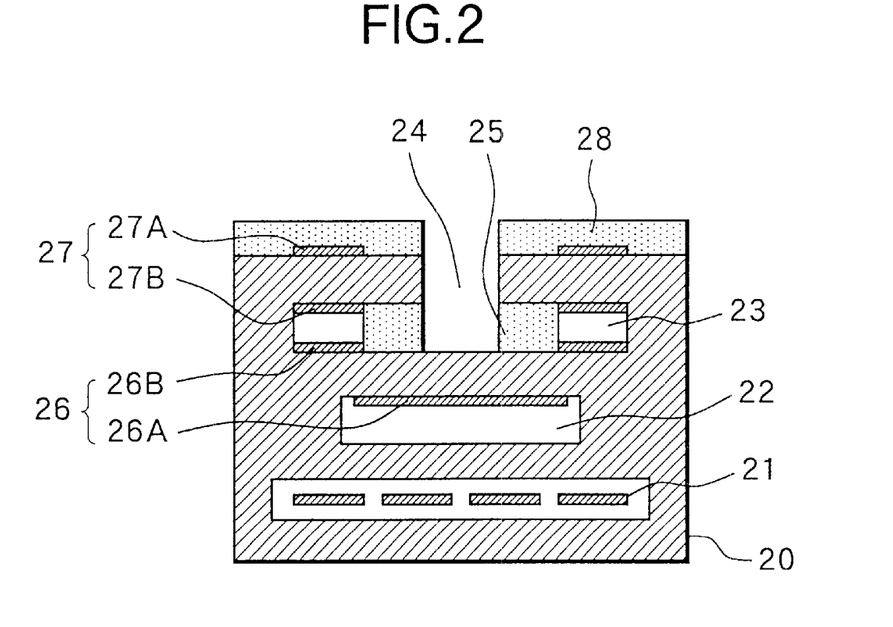
FIG. 2 is a cross section showing a sensor element structure of an air-fuel ratio for use in the above apparatus.

Inside of the body 20, a heater 21, an atmosphere chamber 22, and a gas diffusion chamber 23 are equipped from the bottom in FIG. 2.

The heater 21 is supplied with the electric power to enable to heat the sensor element.

The atmosphere chamber 22 is formed to communicate with an atmosphere being a reference gas, at the outside of the exhaust passage.

The gas diffusion chamber 23 is formed to communicate with the exhaust gas, through a protection layer 25 made of γ aluminum or the like, by an exhaust gas introduction hole 24 formed from an upper side of the body 20 in FIG. 2.

An electrode 26A disposed at an upper wall of the atmosphere chamber 22 and an electrode 26B disposed at a lower wall of the gas diffusion chamber 23 constitute a nernst cell portion 26.

Further, an electrode 27A disposed at an upper wall of the gas diffusion chamber and an electrode 27B disposed at an upper wall of the body 20 and covered with a protection layer 28 constitute a pump cell portion 27.

The nernst cell portion 26 generates a voltage in accordance with an oxygen partial pressure ratio between the nernst cell electrodes 26A, 26B, influenced by oxygen ion concentration (oxygen partial pressure) within the gas diffusion chamber 23.

Accordingly, it is possible to detect whether the air-fuel ratio is richer or leaner than the stoichiometric amount of air ($\lambda=1$) by detecting the voltage generated due to the oxygen partial pressure ratio between the nernst cell portion electrodes 26A, 26B.

When a predetermined voltage is applied to the pump cell portion 27, an oxygen ion in the gas diffusion chamber 23 moves so that an electric current flows between the pump cell portion electrodes 27A, and 27B.

A current value (limit current value) Ip flowing between the pump cell portion electrodes 27A and 27B when the predetermined voltage is applied therebetween is affected by the oxygen ion concentration in the gas diffusion chamber 23. Therefore, if the current value Ip is detected, the air-fuel ratio of exhaust gas can be detected.

Figure 3A:
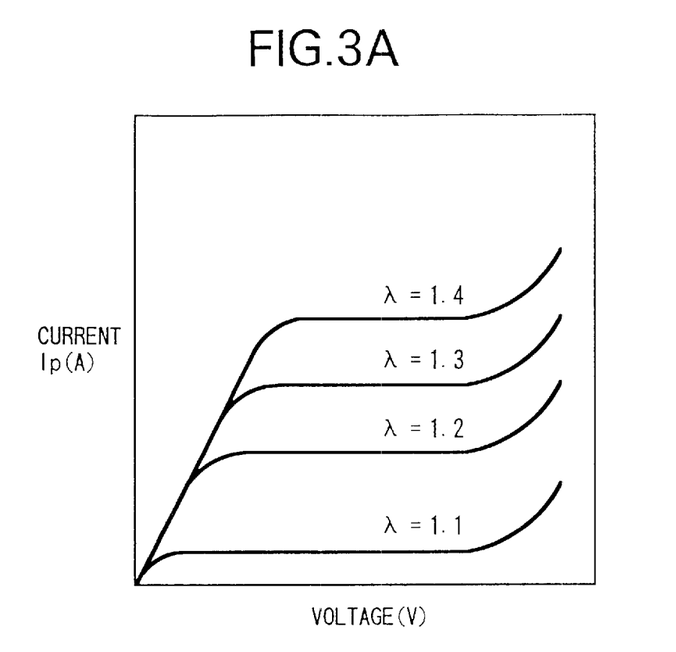
FIG. 3 is a characteristic diagram of a sensor element of the air-fuel ratio sensor.

Namely, as shown in FIG. 3A, since a voltage-current characteristic of the pump cell portion 27 is varied depending on the air-fuel ratio $\lambda$, the air-fuel ratio $\lambda$ of exhaust gas can be detected based on the current value Ip when the predetermined voltage Vp is applied.

Figure 3B:
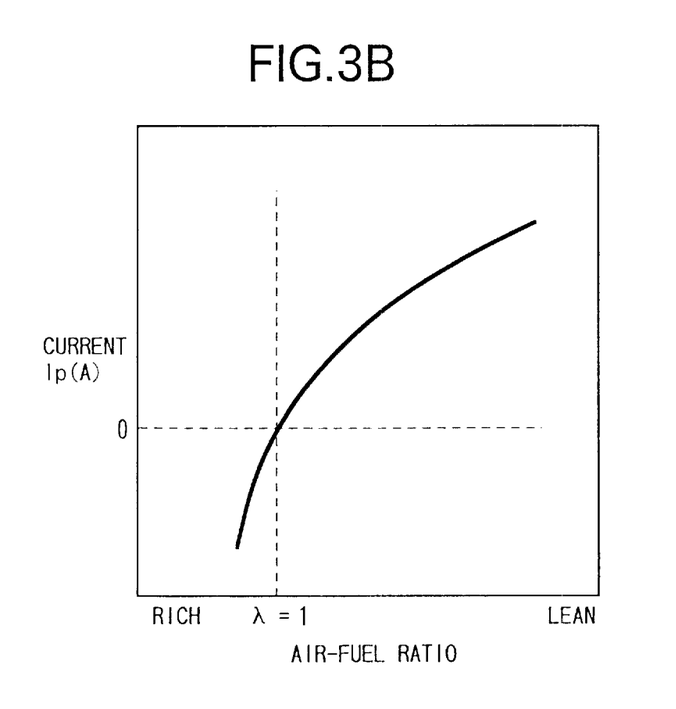

When an application direction of the voltage to the pump cell portion 27 is reversed based on an output of lean or rich from the nernst cell portion 26, in both of air-fuel ratio regions of a lean region and a rich region, as shown in FIG. 3 B, a wide range air-fuel ratio $\lambda$ can be detected based on the current value Ip flowing through the pump cell portion 27.

An impedance of the sensor element with the above described structure and characteristic is measured by applying an alternating voltage with a high frequency to the sensor element (especially the nernst cell portion 26) in order to control the power supply to the heater 21.

Figure 4:
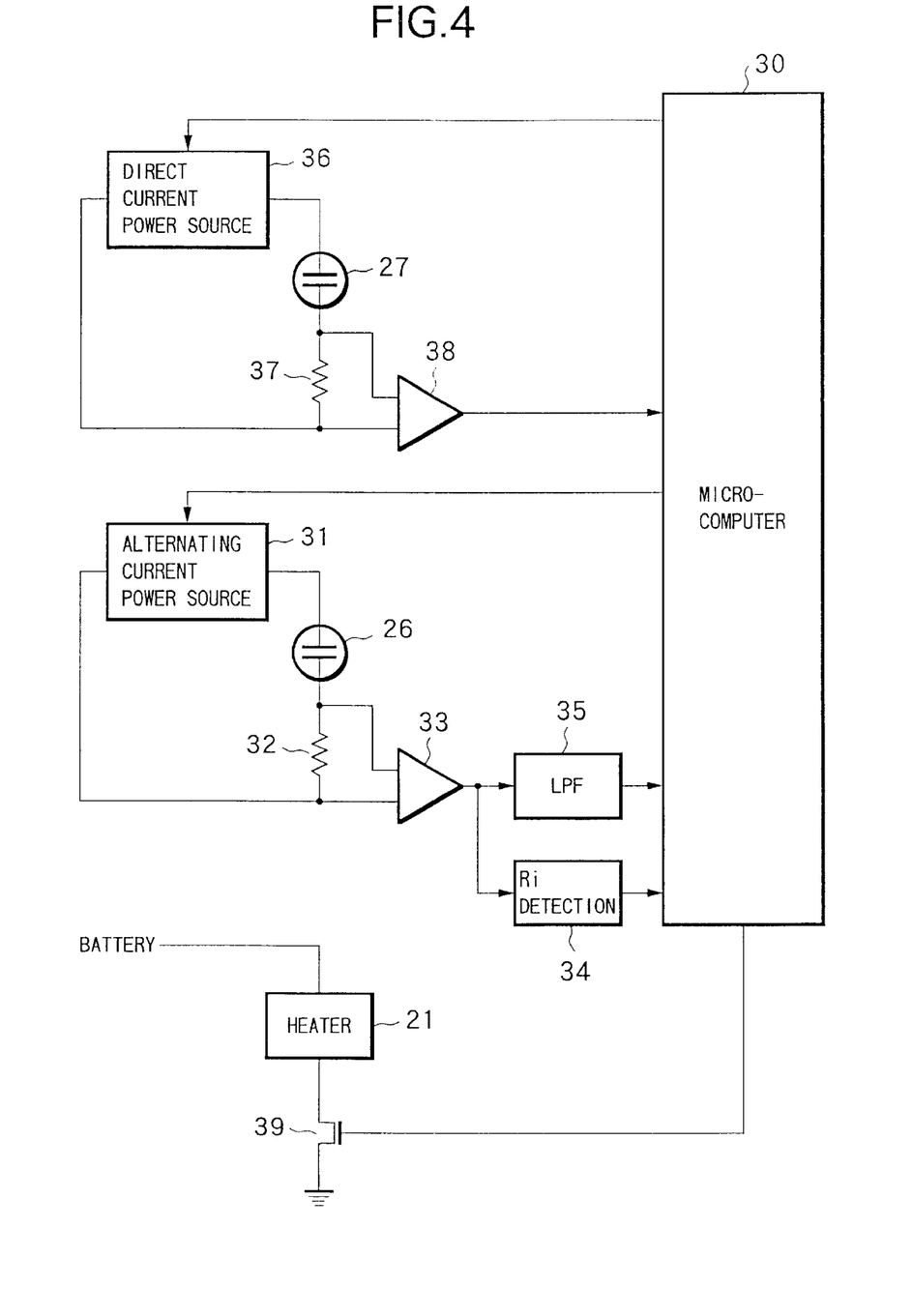
FIG. 4 is a control circuit diagram for the sensor element and a heater of the air-fuel ratio sensor.

A control circuit for the sensor element (nernst cell portion and pump cell portion) of the air-fuel ratio sensor and for the heater for heating the sensor element will be explained based on FIG. 4.

In order to detect the impedance, an alternating voltage with a high frequency (frequency f=3 KHz, amplitude 1.75V) is applied to the nernst cell portion 26 by an alternating current source 31 under the control of a microcomputer 30, so that a current value Is flowing through the nernst cell portion 26 is transformed into a voltage by a current detection resistance 32 and a detection amplifier 33.

A signal from the detection amplifier 33 is input to an impedance detection circuit 34 constituted by a bypass filter and an integrator, so that an alternating component only is taken out to detect the impedance Ri from the amplitude of the alternating component. Thus, the impedance Ri of the nernst cell portion 26 can be detected.

Further, the signal from the detection amplifier 33 is input to a low pass filter 35, so that a direct component only is taken out to detect a voltage generated at the nernst cell portion 26 in accordance with the oxygen concentration. Thus, it is possible to detect the rich/lean of the oxygen concentration.

A predetermined voltage Vp is applied to the pump cell portion 27 by a direct current source 36 under the control of the microcomputer 30. An application direction of the voltage is reversed in accordance with the rich/lean of the oxygen concentration detected by the nernst cell portion 26, so that the current Ip flowing through the pump cell portion 27 is transformed into a voltage by a current detection resistance 37 and a detection amplifier 38. Thus, the air-fuel ratio $\lambda$ can be detected.

A battery voltage VB is applied to the heater 21 by a battery and a switching element 39 is disposed in a power supply circuit. Accordingly, the ON/OFF of the switching element 39 is duty controlled by the microcomputer 30, to thereby control a power supply amount to the heater 21.

In this invention, the impedance of the sensor element of each of the upstream side air-fuel ratio sensor 6 and the downstream side air-fuel ratio sensor 8 is measured in the above manner, so that a sensor element temperature, that is, a temperature of the exhaust gas passing through each of the air-fuel ratio sensors 6 and 8, is estimated based on the measured impedance. These estimated temperatures are averaged to estimate a temperature of the exhaust gas purification catalyst 7.

Figure 5:
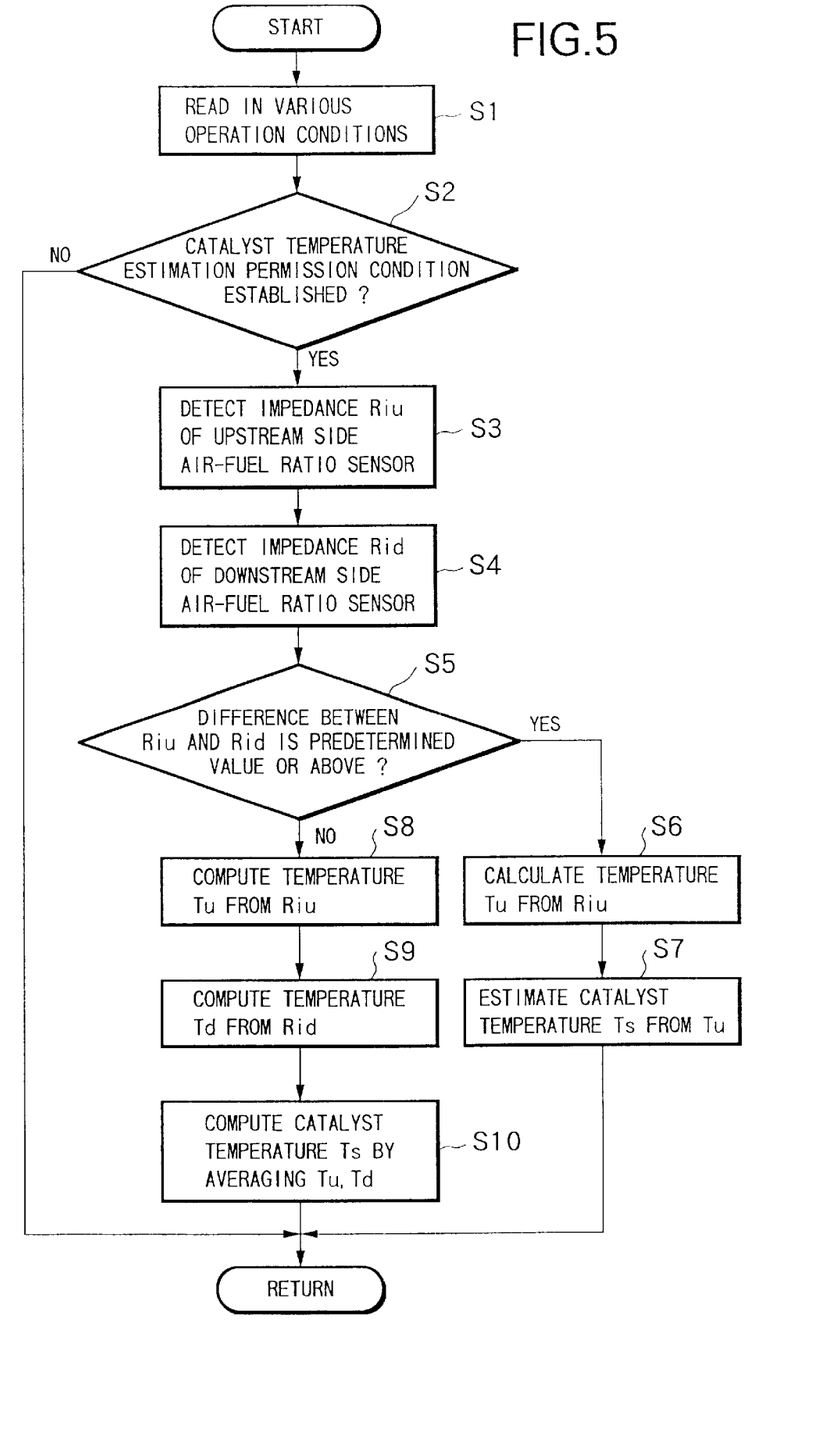
FIG. 5 is a flowchart of impedance measurement and a heater control of the sensor element.

An estimation control of the catalyst temperature to be executed for each predetermined time by the microcomputer 30 after an engine start will be explained according to a flowchart in FIG. 5.

At Step 1 (to be abbreviated as S1 in FIG. 5 and the same rules are applied to the following steps), detection values of various operation conditions are read in.

At Step 2, it is judged whether or not the catalyst temperature estimation is permitted. To be specific, the estimation permission condition is established at a time when a diagnosis result of each of the air-fuel ratio sensors 6 and 8 (including a diagnosis result of an impedance detection circuit) is normal and also when a predetermined time has elapsed after the engine start. The reason why the estimation permission condition includes the elapse of the predetermined time is as follows. Since the heat of the exhaust gas is absorbed, for a while after the engine start, by portions with large heat capacity such as the exhaust pipe until the exhaust gas purification catalyst, and the catalyst itself has large heat capacity, there is a delay in the catalyst temperature to start increasing according to the temperature of the exhaust gas passing through the air-fuel ratio sensor.

Therefore, the estimation detection of the catalyst temperature based on the impedance of the air-fuel ratio sensor is not started until a time has elapsed necessary for ensuring the correlation of the catalyst temperature with the exhaust gas temperature. As a result, the estimation detection can be made with high reliability. In a case where the estimation detection of the catalyst temperature is required prior to the elapse of the time necessary for ensuring the correlation, the estimation can be made based on known estimation methods such as the computation of a heat supply amount from the exhaust gas and a heat radiation amount from the exhaust system by the integration of fuel injection quantity and like.

A condition to prohibit the temperature estimation when the exhaust temperature is greatly varied may be included in the judgment condition of the catalyst temperature estimation permission. This is because, in such a case, the temperature of the exhaust gas purification catalyst 7 cannot be estimated accurately.

If the permission condition of the catalyst temperature estimation is established at Step 2, then at Steps 3 and 4, the impedance Riu of the upstream side air-fuel ratio sensor 6, and the impedance Rid of the downstream side air-fuel ratio sensor 8 are measured as described before.

At Step 5, it is judged whether or not a difference between the impedance Riu the air-fuel ratio sensor 6 and the impedance Rid the air-fuel ratio sensor 8, measured at Steps 3 and 4, is more than a predetermined value. If the difference between the impedance Riu and the impedance Rid is a predetermined value or above, it is considered that the impedance Rid has been greatly varied due to an abrupt temperature change of the downstream side air-fuel ratio sensor 8 caused by water pouring and the like. Therefore, the catalyst temperature Ts is estimated using the impedance Riu of the upstream side air-fuel ratio sensor 6 only.

Namely, the procedure goes to Step 6, wherein by using the impedance Riu of the upstream side air-fuel ratio sensor 6, the sensor element temperature, that is, the temperature Tu of the exhaust gas passing through the air-fuel ratio sensor 6 is estimated. Since the temperature Tu becomes larger as the impedance Riu becomes smaller, the temperature Tu is estimated by searching a table set in such a way (setting 650° C. at 150 Ω, 750° C. at 100 Ω) (the same hereinafter).

Further, the procedure goes to Step 7, wherein the temperature Ts of the exhaust gas purification catalyst 7 is estimated from the estimated element temperature or the exhaust gas temperature Tu. Specifically, the temperature Ts is estimated by making a predetermined correction to the temperature Tu taking in consideration of heat radiation amount from the exhaust pipe of from the air-fuel ratio sensor 6 to the exhaust purification catalyst 7, a reaction heat in the exhaust purification catalyst 7 and the like.

On the other hand, when it is judged that the difference between the impedance of the air-fuel ratio sensor 6 and the impedance of the air-fuel ratio sensor 8 measured at Steps 3 and 4 is less than the predetermined value at Step 5, it is determined that the above problems have not occur, and the temperature estimation of the exhaust gas purification catalyst 7 is performed based on the measured impedance values of the upstream side and downstream side air-fuel ratio sensors 6 and 8.

Namely, the element temperatures or the exhaust gas temperatures Tu, Td of the air-fuel ratio sensors 6 and 8 are estimated based on the impedance of the upstream side air-fuel ratio sensor 6 and the impedance of the downstream side air-fuel ratio sensor 8 at Step 8 and then at Step 9.

Then, at Step 10, the temperature Ts of the exhaust gas purification catalyst 7 is estimated by averaging the estimated element temperatures or the estimated exhaust gas temperatures of the upstream side air-fuel ratio sensor 6 and the downstream side air-fuel ratio sensor 8 according to the following equation.

$$Ts=(m \cdot Tu + n \cdot Td)/(m+n)$$

Here, conveniently, the averaging may be made simply as m=n=1. However, since in general, the downstream side air-fuel ratio sensor 8 is disposed closer to the exhaust gas purification catalyst 7 than the upstream side air-fuel ratio sensor 6, and the exhaust gas exposed to the reaction heat by the exhaust gas purification catalyst 7 flows through the downstream side air-fuel ratio sensor 8, it can be regarded that the temperature Td of the downstream side air-fuel ratio sensor 8 reflects greatly the temperature of the exhaust gas purification catalyst 7 compared to the temperature Tu of the upstream side air-fuel ratio sensor 6. Accordingly, the estimation accuracy may be improved by setting the weight n to the temperature Td of the downstream side air-fuel ratio sensor 8 to be greater than the weight m to the temperature Tu of the upstream side air-fuel ratio sensor 6.

In an internal combustion engine equipped with air-fuel ratio sensors at the upstream and downstream of an exhaust gas purification catalyst, the temperature of the catalyst may be estimated by using one of the upstream and downstream side air-fuel ratio sensors as an embodiment of estimating a catalyst temperature more simply than the above embodiment, to thereby enable the reduction of calculation load.

In this case, since generally the downstream side air-fuel ratio sensor is closer to the exhaust gas purification catalyst than the upstream side air-fuel ratio sensor, and the temperature of the exhaust gas exposed to the reaction heat by the catalyst can be estimated, the catalyst temperature can be estimated with high accuracy by using the impedance of the downstream side air-fuel ratio sensor. In particular, in an apparatus where water from the ground is prevented such that the downstream side air-fuel ratio sensor is disposed in an exhaust passage bypassing an exhaust gas purification catalyst or a water-proof wall is used for covering the air-fuel ratio sensor, this construction is recommended. On the other hand, in an apparatus without taking the water-proof measures, by using the impedance of the upstream side air-fuel ratio sensor, the reliability in estimation can be always ensured.

Moreover, the present invention can also be applied to an apparatus where one air-fuel ratio sensor is disposed only at the upstream of the exhaust gas purification catalyst to perform an air-fuel ratio feedback control, so that the temperature of the exhaust gas purification catalyst can be estimated based on the impedance of the upstream side air-fuel ratio sensor only.

The entire contents of basic Japanese Patent Application No. 2000-180469, filed Jun. 15, 2000, a priority of which is claimed, are incorporated herein by the reference.

What is claimed:

1. An apparatus for detecting a catalyst temperature, comprising:

at least one air-fuel ratio sensor disposed in an exhaust system in an internal combustion engine, for detecting an air-fuel ratio of the air-fuel mixture supplied to said internal combustion engine, based on an exhaust gas component;

an exhaust gas purification catalyst disposed in said exhaust system, for purifying pollutant materials in the exhaust gas;

at least one detection circuit for detecting an impedance of a sensor element of said at least one air-fuel ratio sensor; and a computation circuit for estimating and computing a temperature of said exhaust gas purification catalyst based on said detected impedance.

2. An apparatus for detecting a catalyst temperature according to claim 1, wherein said at least one air-fuel ratio sensor is disposed at the upstream side and at the downstream side of said exhaust gas purification catalyst, respectively;

said at least one detection circuit is operative to detect the impedances of said air-fuel ratio sensor elements; and said computation circuit is operative to estimate and compute the temperature of said exhaust gas purification catalyst based on said impedances.

3. An apparatus for detecting a catalyst temperature according to claim 2, wherein said computation circuit sets weights on the impedance of the sensor elements of said first and second air fuel ratio sensors, said weight is selected on a basis of one or more of a position and closeness of the air-fuel ratio sensor with respect to said exhaust gas purification catalyst, to estimate and compute the temperature of said exhaust gas purification catalyst.

4. An apparatus for detecting a catalyst temperature according to claim 2, wherein said computation circuit is operative to compute a difference between the impedance of the sensor elements of said first air-fuel ratio sensor and the impedance of the sensor elements of said second air-fuel ratio sensor, and is operative to estimate and compute the temperature of said exhaust gas purification catalyst based on the impedance of said first air-fuel ratio sensor only when said difference is equal to or greater than a predetermined value.

5. An apparatus for detecting a catalyst temperature according to claim 1, wherein said at least one air-fuel ratio sensor is disposed at the upstream side and at the downstream side of said exhaust gas purification catalyst, respectively, said at least one detection circuit is operative to detect the impedance of the sensor element of only one of said air-fuel ratio sensors, said only one sensor being determined in advance; and said computation circuit estimates and computes the temperature of said exhaust gas purification catalyst based on the impedance of the sensor element of said one air-fuel ratio sensor.

6. An apparatus for detecting a catalyst temperature according to claim 1, wherein said at least one air-fuel ratio sensor is disposed only at the upstream side of said exhaust gas purification catalyst.

7. An apparatus for detecting a catalyst temperature according to claim 1, wherein said computation circuit starts said estimating and computing of the temperature of said exhaust gas purification catalyst after a predetermined time has elapsed from an engine start.

8. An apparatus for detecting a catalyst temperature according to claim 1, wherein said air-fuel ratio sensor includes a nernst cell portion for generating a voltage in accordance with the rich/lean of the air-fuel ratio and a pump cell portion to which a predetermined voltage is applied in a direction corresponding to the rich/lean of the air-fuel ratio to vary a current value thereof successively corresponding to the air-fuel ratio, and said detection circuit being operative to apply an alternating current to said nernst cell portion to measure an impedance of said nernst cell portion as the sensor element, based on a current value flowing through said nernst cell portion.

9. An apparatus for detecting a catalyst temperature according to claim 1, wherein said at least one air-fuel ratio sensor includes a heater for heating the sensor element of said at least one air fuel ratio sensor, and the power supply to said heater is controlled based on the impedance of the sensor element.

10. An apparatus for detecting a catalyst temperature, comprising:

an air-fuel ratio sensor disposed in an exhaust system of an internal combustion engine, for detecting an air-fuel ratio of an air-fuel mixture supplied to said internal combustion engine, based on an exhaust gas component;

an exhaust gas purification catalyst disposed in said exhaust system, for purifying pollutant materials in the exhaust gas;

impedance detecting means for detecting an impedance of a sensor element of said at least one air-fuel ratio sensor; and catalyst temperature estimating means for estimating a temperature of said exhaust gas purification catalyst based on said detected impedance.

11. A method for detecting a catalyst temperature, comprising the following steps:

detecting an impedance of at least one sensor element of at least one air-fuel ratio sensor disposed in an exhaust system of an internal combustion engine; and estimating and computing a temperature of an exhaust gas purification catalyst disposed in said exhaust system based on said impedance.

12. A method for detecting a catalyst temperature according to claim 11, wherein said at least one air-fuel ratio sensor is disposed at the upstream side and at the downstream side of said exhaust gas purification catalyst, respectively, and the temperature of said exhaust gas purification catalyst is estimated and computed based on the impedances of the sensor elements of said air-fuel ratio sensors.

13. A method for detecting a catalyst temperature according to claim 12, further comprising;

setting a weight on the impedance of the sensor element of said air-fuel ratio sensors based on at least one of the closeness and location of said sensor to said exhaust gas purification catalyst, and estimating and calculating the temperature of said exhaust gas purification catalyst based on the weighted impedance values.

14. A method for detecting a catalyst temperature according to claim 12, wherein a difference between the impedance of the sensor elements of said upstream side air-fuel ratio sensor and the impedance of the sensor elements of said downstream side air-fuel ratio sensor is computed, and the temperature of said exhaust gas purification catalyst is estimated and computed based on the impedance of said upstream side air-fuel ratio sensor only when said difference is equal to or greater than a predetermined value.

15. A method for detecting a catalyst temperature according to claim 12, wherein said air-fuel ratio sensor is disposed at the upstream side and the downstream side of said exhaust gas purification catalyst, respectively, and the temperature of said exhaust gas purification catalyst is estimated and computed based on the impedance of only one of the sensor elements of said one air-fuel ratio sensor.

16. A method for detecting a catalyst temperature according to claim 12, wherein the temperature of said exhaust gas purification catalyst is estimated and computed based on the impedance of the sensor element of only said air-fuel ratio sensor disposed at the upstream side of said exhaust gas purification catalyst.

17. A method for detecting a catalyst temperature according to claim 12, wherein estimating and computing of the temperature of said exhaust gas purification catalyst based on the impedance of at least one air-fuel ratio sensor is started after a predetermined time has elapsed from an engine start.

18. A method for detecting a catalyst temperature according to claim 12, wherein said at least one air-fuel ratio sensor includes a nernst cell portion for generating a voltage in accordance with the rich/lean of the air-fuel ratio and a pump cell portion to which a predetermined voltage is applied in a direction corresponding to the rich/lean of the air-fuel ratio to vary a current value thereof successively corresponding to the air-fuel ratio, said method further comprising:

applying an alternating current to said nernst cell portion and measuring an impedance of said nernst cell portion as the sensor element, based on a current value flowing through said nernst cell portion.

19. A method for detecting a catalyst temperature according to claim 12, further comprising:

heating the sensor element, and controlling said heating step based on the impedance of the sensor element.

* * * * *